April 28, 1931.  G. C. MORANGIER  1,802,523
COUPLING
Filed April 23, 1925
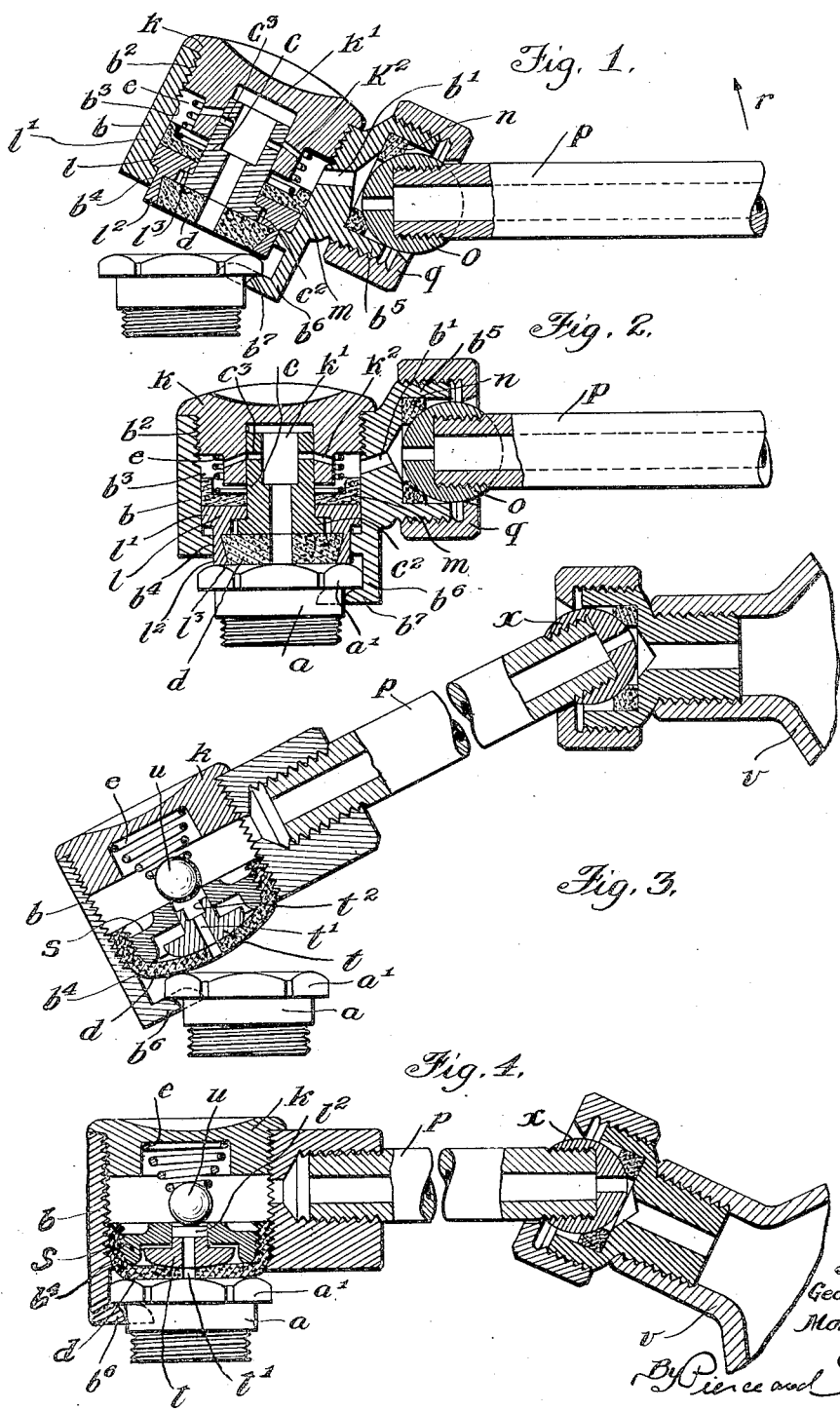

Patented Apr. 28, 1931

1,802,523

UNITED STATES PATENT OFFICE

GEORGES CHARLES MORANGIER, OF MORET-SUR-LOING, FRANCE, ASSIGNOR TO ALEMITE CORPORATION, OF CHICAGO, ILLINOIS, A CORPORATION OF DELAWARE

COUPLING

Application filed April 23, 1925, Serial No. 25,351, and in France October 31, 1923.

It has been stated in the French Patent #572,500, of October 31, 1923, for "Instantaneous couplings for pressure lubrication", that the lubricating fittings for lubricating the moving parts of automobiles are provided with an automatic check valve, and filled with hard grease injected by hand with a pump. This pump is provided with a flexible tube at the end of which is a coupling to be positioned on the valve body of the lubricating fitting and held there during injection by means of various clamping devices.

In the various greasing systems already known, it is necessary, before disconnecting the coupling from the valve body of the fitting, to reduce the pressure of the lubricant inside the injection pump to zero, so as to avoid losing grease, or sometimes blow out the leather packing for the joint.

The primary object of the patent of October 31, 1923, is to eliminate such inconveniences. It describes an embodiment of coupling, characterized by a closure member, having a movement of translation with respect to the coupling in a plane perpendicular to the axis of the latter, the movement being employed not only to cover and uncover the lubricating aperture in the coupling but also to connect and disconnect the coupling with a fitting.

The development of the coupling, the tests and studies which have been made in connection therewith, have lead to the development of other embodiments, different in appearance but related to each other and to the coupling described in the patent of October 31, 1923, by a common characteristic rendered obvious by a complete examination of these different embodiments.

In this instance they all comprise a closure member which cannot be opened by the pressure of the lubricant, but only by a force in a direction other than that of the pressure, this force being, furthermore, necessary to clamp the coupling on a lubricating fitting, while uncoupling moves the closure member back to closed position.

In the embodiment shown and described in the patent of October 31, 1923, several specific features will be noted:

1. The force to be exerted on the closure member to open it is perpendicular to the direction of the pressure of the lubricant upon it.

2. The closure member is a slide having a movement of translation. It has been pointed out in the patent of October 31, 1923 that this translation can be either straight line or circular, in other words it could have any desired trajectory. It should also be noted that the slide might also move by a rotation.

The accompanying drawings show, for purposes of illustration, two other embodiments, in which the force necessary to open the closure member is directly opposed to the direction of the pressure of the lubricant thereon.

In one of these embodiments, shown just before coupling by the section of Fig. 1, and coupled up in Fig. 2, the closure member is a cylindrical slide, bored axially and radially and slidable in a cylindrical sleeve bored radially, which sleeve is integral with the connector bore.

In the embodiment shown in Figs. 3 and 4 in the same way as the preceding modification, the closure member is a valve which may be lifted from its seat by a small piston having an axial bore, in such a way that the lubricant can enter said axial bore when the valve is lifted.

It will be evident that one can readily devise other modifications, differing for instance:

1. As to the direction of the force which must be applied to the closure member to open it;

2. As to the means employed to transmit such force to the closure member when the coupling is clamped on the fitting;

3. As to the means employed to bring the closure member back to position when its parts are disconnected;

4. As to the nature of the closure member and the movements it can make.

Such modifications, which do not in any way change the basic principle set forth hereinabove, are obviously included within the scope of the invention.

The two embodiments shown in the drawing are described more in detail hereinafter with reference to said drawing. In this description the same reference characters have been employed as in the patent of October 31, 1923, to designate similar parts performing similar functions.

In both modifications the head of the fitting is indicated by $a$. This head has the usual clamping collar $a^1$, which in this instance is hexagonal. The body $b$ of the coupling is hollow and closed at its upper end by a threaded plug $k$.

In the embodiment of Figs. 1 and 2 the inner bore of the connector body comprises three portions of different diameters;

The first portion $b^2$, which has the greatest diameter, is threaded to receive the plug $k$;

The second, $b^3$ forms a cylinder in which a piston 1, to be described hereinafter, moves;

The third, $b^4$ is of the smallest diameter and thus forms an abutment shoulder for the piston $l$. This latter comprises two portions of which the first $l^1$ slides in the cylinder $b^3$, and the second $l^2$ slides in the portion $b^4$. A packing $m$ rests on the head of piston $l$, and a spring $e$ bears between the plug $k$ and the packing $m$.

The piston $l$ has an interior bore formed in three portions in which is mounted a cylindrical member $c$ forming the slide. The slide $c$ abuts with its shoulder $c^2$ against the shoulder $l^3$ of the piston $l$ and is held by the yielding washer $d$ entered in the trapezoidal portion of the inner bore of the piston $l$. This washer operates to form a tight joint with the end of the fitting $a$.

The slide $c$ is axially bored, and also the washer $d$ beyond it. The other portion of the slide moves in the cylindrical bore $k^1$ in which are formed the ports $k^2$ opening from the inner bore of the body of the connector $b$. The slide $c$ also has radial holes $c^3$ so that when these holes register with the ports $k^2$ communication will be established between the inner chamber of the connector and the axial bore of the slide $c$.

The head of the coupler $b$ has a lateral opening $b^1$ communicating with a cylindrical cup in the boss $b^5$, the outer portion of which boss is threaded. Packing means $n$ is positioned in this cup against which the spherical tip $o$ of the lubricant delivery tube $p$ abuts. The tip is held in place by the threaded cap $q$. The tube can thus occupy any position within the limits of a cone, the two generatrices of which are indicated by the drawings, which will make it possible to reach a fitting in a very poorly accessible position.

The head of the connector $b$ comprises, furthermore, on the same side as the boss $b^5$, a projection $b^6$ cut away internally so as to embrace the flange $a^1$ of the head of the fitting $a$. The parts are so proportioned that the clamping of the connector on the fitting forces the piston $l$ to rise against the tension of the spring $e$. To permit engagement, the lip $b^7$ of the projection $b^6$ is curved on its inner edge opposite the outer end of the piston $l$ so that by presenting the coupler at an angle to the fitting (see Fig. 1) and at the same time pushing on the tube $p$ and lifting it in the direction of the arrow $r$, clamping of the coupler on the fitting will be accomplished. Disconnection is brought about by reversing the process, i. e. by pulling lightly on the tube $p$ and moving it down in a direction opposite to the arrow $r$.

The piston $l$ as it rises when the coupler is clamped on the fitting brings the orifice $c^3$ into registration with the ports $k^2$. The injection pump may now be actuated, and the resulting pressure will bear heavily against the joint $d$ on the head of the fitting to keep it tight. Lubricant will flow through the ports $k^2$ and $c^3$ and through the central hole of the piston $l$ and out at the joint $d$, (see Fig. 2).

Upon disconnecting, the pressure of the lubricant and of the spring $e$, acting together in the same direction, will push the piston $l$ and the slide $c$ down so that the opening $c^3$ will no longer register with the ports $k^2$ and the delivery of the lubricant is interrupted.

In the modification shown by Figs. 3 and 4, the inner bore of the body of the coupler $b$ is threaded throughout its length except for a shoulder $b^4$ gently tapered inward. Another packing $d$ is threaded therein and held in place with a threaded ring $s$ as shown in the drawing. The packing $d$ is not drawn closely up to the lower face of the ring $s$ but permits a small piston $t$ to have a predetermined movement in an axial hole in the ring $s$. The packing $d$ and the small piston $t$ are bored axially at $t^1$ and the piston $t$ is also cut away at $t^2$ at its upper end, and is more clearly shown in Fig. 4, in which the piston has been rotated 90° on its axis. By its rising movement, piston $t$ can lift the valve $u$, normally seated on the axial bore of ring $s$ under the action of the spring $e$. In this embodiment the tube $p$ is threaded directly into the coupler, and connected to the pump $v$ by a universal joint $x$ completely analogous to that previously described. The projection or clamping hook $b^6$ is also positioned on the side opposite the tube $p$ instead of on the same side as heretofore.

On account of this arrangement, the movements for coupling and uncoupling will be exactly the opposite of those required in the first embodiment. On this account it is not necessary to describe the operation again. It will be seen that in the coupled position of Fig. 4 the lubricant has free access to the fitting. The pressure of the packing $d$ on the fitting increases with increase of pressure of lubricant, which acts on the small piston $t$. It will also be obvious that as soon as the parts are uncoupled the spring e will return the valve u to its seat, interrupting the delivery of lubricant. It may also be mentioned that the clamping system of Figs. 1 and 2 is equally applicable to the connection means of Figs. 3 and 4, and vice versa.

Without further elaboration the foregoing will so fully explain the gist of the invention, that others may, by applying current knowledge, readily adapt the same for use under various conditions of service without eliminating certain features which may properly be said to constitute the essential items of novelty involved, which items are intended to be defined and secured by the following claims.

I claim:

1. Lubricating apparatus of the class described comprising, in combination, a lubricant receiving fitting adapted to be attached to a bearing and having a coupling projection thereon, a lubricant compressor, a coupling connected thereto and supplied therefrom, said coupling including a body member, a bore therein, a shoulder, a lubricant-pressed sealing member slidable in said bore, a spring for holding said sealing member against said shoulder, a depending part rigid with said body part, and a laterally projecting end on said depending part for co-operating with said fitting projection to lock said fitting and coupling in sealing engagement upon tilting said coupling in a plane containing the axis of the fitting.

2. A lubricant supply system comprising a fitting, a coupling, said fitting and coupling having cooperating means for releasably clamping the coupling on the fitting by rotation of the coupling about an axis spaced from the axis of the fitting, a sealing member reciprocable within said coupling and adapted to contact with the fitting, a shoulder within the coupling, a compression spring disposed between said shoulder and sealing member urging said sealing member downwardly, a compressor, a rigid conduit connecting said coupling and said compressor, and a universal joint at one end of said conduit, said universal joint permitting rotation of said coupling relative to said compressor during the coupling operation.

3. A lubricant supply system comprising a fitting, a coupling, said fitting and coupling having cooperating rigid portions for releasably clamping the coupling on the fitting by rotation of the coupling about an axis spaced from the axis of the fitting, a sealing member reciprocable within said coupling, a shoulder within the coupling, a compression spring disposed between said shoulder and sealing member to urge said sealing member against the fitting when the parts are clamped together, a compressor, and a rigid conduit connecting said coupling and said compressor.

4. A lubricant supply system comprising a fitting, a coupling, a valve in said coupling automatically opened by the coupling operation and automatically closed during the uncoupling operation, said fitting and coupling having cooperating rigid portions for releasably clamping the coupling on the fitting by rotation of the coupling about an axis spaced from the axis of the fitting, said rigid portions permitting unclamping of the coupling when rotated in the opposite direction, a compressor, and a conduit connecting said coupling and said compressor, said conduit being substantially normal to both of said axes during a lubricating operation and serving to hold said coupling and fitting in sealing engagement throughout such operation.

In witness whereof, I hereunto subscribe my name, this 31st day of March, 1925.

GEORGES CHARLES MORANGIER.